United States Patent [19]

Nakahashi et al.

[11] Patent Number: 4,987,791
[45] Date of Patent: Jan. 29, 1991

[54] MINIATURE MOTOR WITH A WORM REDUCTION GEAR

[75] Inventors: Hiroaki Nakahashi; Tsutomu Saya; Junich Yamazaki, all of Matsudo, Japan

[73] Assignee: Mabuchi Motor Company, Ltd., Chibaken, Japan

[21] Appl. No.: 483,334

[22] Filed: Feb. 20, 1990

Related U.S. Application Data

[63] Continuation of Ser. No. 314,818, Feb. 23, 1989, abandoned.

[30] Foreign Application Priority Data

Mar. 4, 1988 [JP] Japan .................................. 63-28870

[51] Int. Cl.$^5$ .............................................. F16H 1/16
[52] U.S. Cl. ...................................... 74/425; 74/89.14
[58] Field of Search ............................. 74/425, 89.14

[56] References Cited

U.S. PATENT DOCUMENTS

| | | | |
|---|---|---|---|
| 2,734,393 | 2/1956 | Luenberger | 74/425 |
| 3,067,627 | 12/1962 | Pickles | 74/425 |
| 3,523,599 | 8/1970 | Denkowski | 74/425 X |
| 3,742,781 | 7/1973 | Boyriven | 74/425 X |
| 3,848,477 | 11/1974 | Giandinoto et al. | 74/425 |
| 3,972,597 | 8/1976 | Repay et al. | 74/425 X |
| 4,023,430 | 5/1977 | Imamura | 74/425 X |
| 4,542,814 | 9/1985 | Ledeen et al. | 74/425 X |
| 4,652,781 | 3/1987 | Andrei-Alexandru et al. | 74/425 |
| 4,699,017 | 10/1987 | Periou | 74/425 |
| 4,791,831 | 12/1988 | Behnke et al. | 74/425 X |

Primary Examiner—Peter R. Brown
Attorney, Agent, or Firm—McGlew & Tuttle

[57] ABSTRACT

A miniature motor with a worm reduction gear comprising a miniature motor having a motor shaft, which is of a relatively small diameter and which is extended to a predetermined length, at least three bearings supporting the motor shaft, and a worm having a shaft hole into which the motor shaft is inserted. Since the miniature motor and the worm reduction gear are manufactured separately, and subsequently assembled together by press-fitting the motor shaft in to the shaft hole of the worm the assembly of the miniature motor with a worm reduction gear is facilitated. The use of a motor shaft having a diameter smaller than the diameter of the worm helps reduce the size and weight of the miniature motor with a worm reduction gear.

1 Claim, 2 Drawing Sheets

MINIATURE MOTOR WITH A WORM REDUCTION GEAR

This is a file wrapper continuation application of application Ser. No. 314,818 filed Feb. 23, 1989 now abandoned.

BACKGROUND OF THE INVENTION (1) Field of the Invention

This invention relates generally to a miniature motor with a worm reduction gear, and more particularly to a miniature motor with a worm reduction gear generating motor output via a worm reduction gear, in which the motor shaft of the miniature motor is extended to a predetermined length, a worm on the worm reduction gear has a shaft hole into which the motor shaft is inserted, and the worm is fixedly fitted to the motor shaft by press-fitting the motor shaft to the shaft hole of the worm, thereby making it possible to reduce the diameter of the motor shaft and the size and weight of the miniature motor with a worm reduction gear.

(2) Description of the Prior Art

A miniature motor with a worm reduction gear in which a worm is formed on an end of the motor shaft and brought in mesh with a worm wheel is known for use in drive units for automotive electrical parts, for example.

FIG. 1 shows one example of the conventional type miniature motor with a worm reduction gear. In the conventional type miniature motor with a worm reduction gear shown in the figure, a worm is formed on an extended part of a motor shaft for the sake of convenience in manufacture and assembly. In FIG. 1 illustrating the cross-section of the conventional type miniature motor with a worm reduction gear, numeral 1 refers to a motor portion; 2 to a reduction gear portion; 3 to a rotor; 4 to a motor shaft; 6 to a worm portion; 7 to a worm wheel; 8 to an output shaft; 9 to a steel ball; 10 to a thrust-bearing plate; 11 to a magnet; 12 to a commutator; 13 to brush; 14 and 15 to bearings; 16 to a motor case; and 17 to a gear case, respectively. Symbol A refers to a thrust-bearing screw; and B to a nut;

In a miniature motor with a worm reduction gear, the outside diameter of the worm is usually set to a predetermined value in accordance with the desired output and reduction gear ratio. In the case of the example shown in FIG. 1, since the worm portion 6 is formed on an extended part of the motor shaft 4, and the bearing 14 is provided on the gear case 17, the inside diameter of the bearing 14 has to be made larger than at least the outside diameter of the worm portion from considerations in assembly. As a result, the diameter of the motor shaft 4 has to be made larger than at least the outside diameter of the worm portion 6, and the outside diameter of the rotor 3 also has to be increased by that amount. This tends to make it difficult to reduce the size and weight of the motor portion, posing an unwanted problem of the difficulty in reducing cost.

SUMMARY OF THE INVENTION

It is an object of this invention to provide a miniature motor with a worm reduction gear in which the size and weight of the motor is reduced by reducing the diameter of the motor shaft of the miniature motor proper.

It is another object of this invention is to provide a miniature motor with a worm reduction gear in which the manufacture of the miniature motor and the assembly of the motor portion and the worm reduction gear portion are facilitated, and the size and weight of the motor portion are reduced by manufacturing the miniature motor shaft and the worm separately.

It is still another object of this invention to provide a miniature motor with a worm reduction gear in which some misalignment of the miniature motor shaft and the bearings can be compensated by the deflection of the motor shaft of a reduced diameter without giving close attention to the positional accuracy of the bearings supporting the motor shaft.

One feature of this invention is that the invention relates to a miniature motor with a worm reduction gear generating motor output via a worm reduction gear, characterized in that the motor shaft of the miniature motor is extended to a predetermined length; an end of the extended part of the motor shaft being supported by three bearings; a worm of the worm reduction gear has a shaft hole into which the miniature motor shaft is inserted; the worm being fixedly fitted to the motor shaft by press-fitting the motor shaft to the shaft hole of the worm; the motor shaft being supported at three locations by the three bearings; and a predetermined distance is provided between the worm and one intermediate bearing among the three bearings.

These and other objects, features and advantages will be better understood from the following description of the invention with reference to the accompanying drawings.

DESCRIPTION OF THE PREFERRED EMBODIMENT

Figure 1:
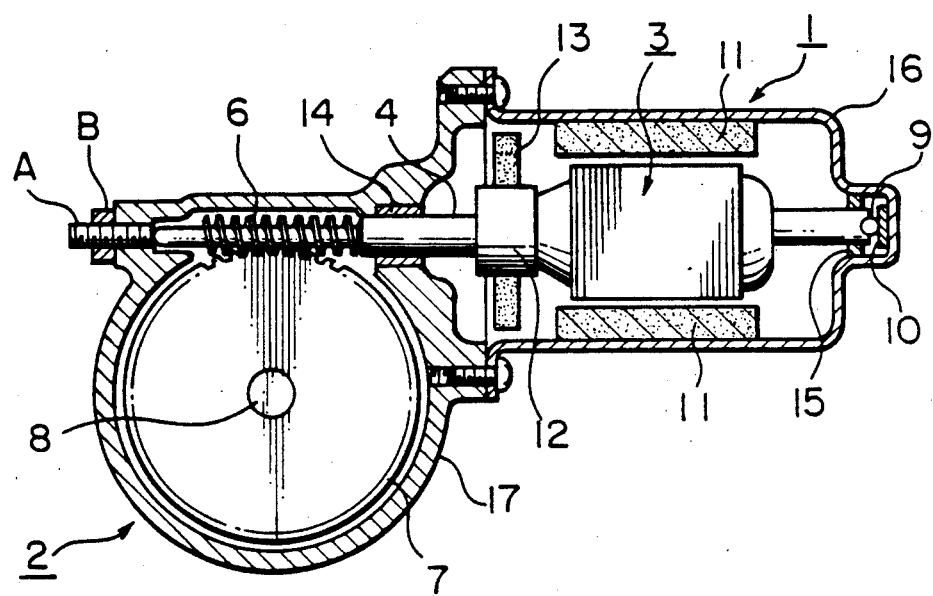
FIG. 1 is a diagram of assistance in explaining a miniature motor with a reduction gear according to prior art.
Figure 2A:
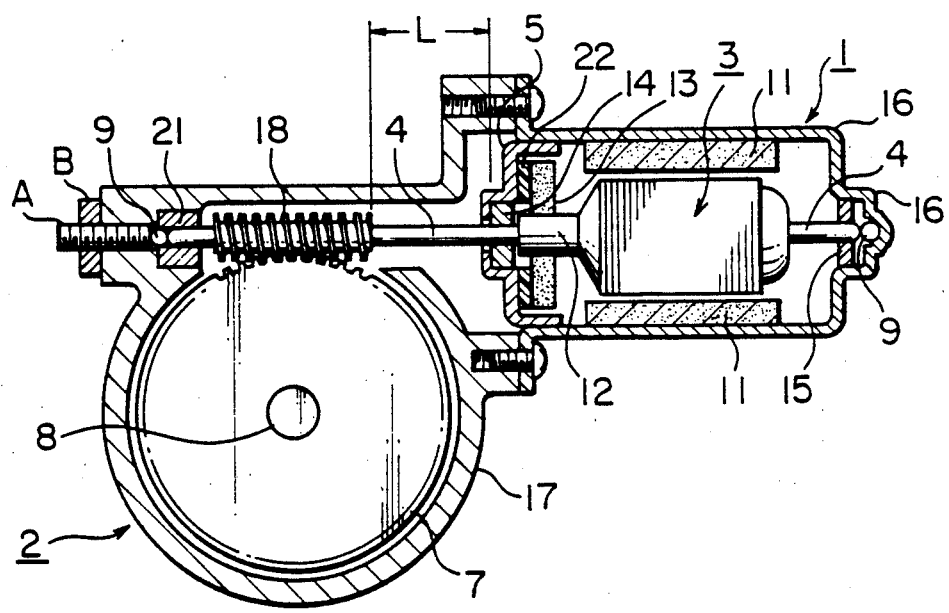
FIG. 2A is an enlarged cross-sectional view of a miniature motor with a reduction gear embodying this invention.

FIG. 2A illustrates a miniature motor with a worm reduction gear embodying this invention. In the figure, numeral 1 refers to a motor portion; 2 to a reduction gear portion; 3 to a rotor; 4 to a motor shaft; 5 to an end plate, made of a metallic material; 7 to a worm wheel; 8 to an output shaft; 9 to a steel ball; 11 to a magnet; 12 to a commutator; 13 to a brush; 14; 15 and 21 to bearings; 16 to a motor case; 17 to a gear case; 18 to a worm having a through-hole; 22 to a synthetic resin plate supporting a brush; symbol A refers to a thrust-bearing screw; and B to a nut, respectively.

Figure 2B:
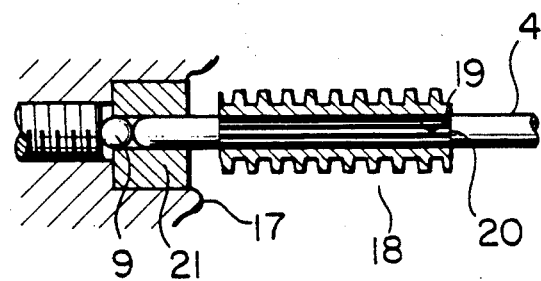
FIG. 2B is an enlarged cross-sectional view of a worm.

The miniature motor with a worm reduction gear according to this invention has an extended motor shaft 4 of a reduced diameter, and the motor portion 1 thereof forms a single motor unit as the end plate 5 is engaged with and fixedly fitted to the motor case 16. The motor shaft 4 of the motor portion 1 is press-fitted to the through-hole of the worm 18 and, when connected to the worm reduction gear portion 2, supported by the three bearings 14, 15 and 21. FIG. 2B is an enlarged cross-sectional view of a worm. In the figure, numeral 18 refers to a worm; 19 to a shaft hole; 20 to a knurled portion; and 21 to a bearing, respectively.

In FIG. 2A, the motor portion 1 has such a construction that the motor shaft 4 having a predetermined shaft length is supported by the two bearings 14 and 15. The worm 18 has a shaft hole 19 into which the motor shaft 4 is inserted. The worm 18 is fixedly fitted to the motor shaft 4 by inserting into, and press-fitting to, the shaft hole 19. A knurled portion 20 is formed on the part of the motor shaft 4 to which the worm 18 is fixedly fitted. When press-fitting the worm 18 to the motor shaft 4, therefore, there is no fear of causing damage to the surface of the tip of the motor shaft 4 (at which the shaft 4 is inserted into the bearing 21).

The embodiment shown in FIG. 2A is a miniature motor with a worm reduction gear in which the motor portion 1 is connected to the reduction gear portion 2 in a state where the worm 18 is fixedly fitted to the extended part of the motor shaft 4, and then the tip of the motor shaft 4 is inserted into the bearing 21 while bringing the worm 18 in mesh with the worm wheel 7 of the reduction gear portion 2, as noted earlier.

As described above, since the embodiment shown in FIG. 2A is constructed so that the worm 18 is press-fitted to the motor shaft 4, the motor shaft 4 can be made of a diameter required to withstand the thrust from the worm 18 and transmit the torque of the rotor 3, or of a diameter far smaller than the diameter of the worm 18. As a result, the size and weight of the motor portion 1 can be reduced. In the miniature motor with a worm reduction gear of this invention, the diameter of the motor shaft 4 may be of the order of 3 to 5 mm when the diameter of the worm 18 is approximately 8 mm, for example.

In the embodiment shown in FIG. 2A, in which the motor shaft 4 is supported by three bearings 14, 15 and 21, some misalignment of the bearings 14, 15 and 21 cannot pose any practical problem by making the motor shaft 4 more flexible, or making at least the length L of the portion of the motor shaft 4 shown by arrows in FIG. 2A more than six times as large as the diameter of the motor shaft 4. This is possible because the motor shaft 4 can be made of a minimum diameter required to withstand the thrust from the worm 18 and transmit the torque of the rotor 3. The fact that the positional accuracy of the bearings 14, 15 and 21 need not be strictly controlled facilitates the assembly of the motor portion 1 and the reduction gear portion 2. Furthermore, when press-fitting the worm 18 to the motor shaft 4, the worm 18 can be firmly secured to the motor shaft 4 by applying adhesive (anaerobic adhesive, for example) between the knurled portion 20 of the motor shaft 4 and the shaft hole 19 of the worm 18.

As is evident from the foregoing description of an embodiment of this invention, this invention makes it possible to reduce the diameter of the motor shaft by press-fitting the worm to the extended motor shaft. This leads to reduced size and weight of the motor portion, and helps contribute to cost reduction in the manufacture of a miniature motor with a worm reduction gear.

The manufacture and assembly of a miniature motor with a worm reduction gear can be facilitated because the motor portion and the reduction gear portion can be manufactured separately and subsequently assembled together by press-fitting the motor shaft to the through-hole of the worm.

While the present invention has been described in its preferred embodiment, it is to be understood that the words which have been used are words of description rather than limitation and that various changes and modifications may be made within the purview of the appended claims without departing from the true scope and spirit of the present invention in its broader aspects.

What is claimed is:

1. A miniature motor and worm reduction gear arrangement, comprising: a gear case; a motor housing connected to said gear case, a miniature motor positioned within said motor housing connected to a motor shaft and a first motor shaft bearing in a first end of said housing and a second end of said motor shaft bearing at a second end of said housing, each of said first and second motor shaft bearings supporting said motor shaft for rotation; a third motor shaft bearing supported by said gear case, said third motor shaft bearing for rotatably supporting said motor shaft; a worm gear element including a shaft hole into which said motor shaft is inserted, said worm gear element being fixedly fitted to said motor shaft by press-fitting said motor shaft to said shaft hole of said worm element, said worm gear element being positioned within said gear case; a worm wheel positioned within said gear case engaging said worm gear element, said motor shaft having a diameter $\phi$, said worm gear being positioned to define a distance L between said worm gear and said second motor shaft bearing such that the distance L between said worm gear and said second motor shaft bearing is at least six times as large as the diameter of said motor shaft $\phi$.

* * * * *